6/9/87 XR 4,672,687

United States Patent [19]

Horton et al.

[11] Patent Number: 4,672,687

[45] Date of Patent: Jun. 9, 1987

[54] POLARITY SWITCH FOR SATELLITE TELEVISION RECEIVER

[75] Inventors: Edwin T. Horton, Ballwin; Robert L. Peterson, Chesterfield, both of Mo.

[73] Assignee: Satellite Technology Services, Inc., St. Louis, Mo.

[21] Appl. No.: 696,034

[22] Filed: Jan. 29, 1985

[51] Int. Cl.[4] ........................ H04B 1/06; H04H 1/00; H04N 5/268

[52] U.S. Cl. ........................ 455/277; 455/3; 455/131; 455/133; 455/140; 333/103; 358/86; 358/181

[58] Field of Search .................... 455/3, 4, 6, 12, 131, 455/133-135, 140, 277, 278; 333/103; 358/86, 181, 188; 343/362

[56] References Cited

U.S. PATENT DOCUMENTS 2,815,440 12/1957 Fletcher .
3,242,433 3/1966 Carlson et al. .
3,839,676 10/1974 Linnecar .
4,139,865 2/1979 Iida et al. .
4,151,557 4/1979 Iida et al. .
4,205,269 5/1980 Watanabe .
4,271,403 6/1981 Severson .
4,352,202 9/1982 Carney .
4,424,591 1/1984 Boardman .
4,430,732 2/1984 Saga et al. .
4,432,015 2/1984 Lambert et al. .
4,492,937 1/1985 Theriault ........................ 333/103
4,509,198 4/1985 Nagatomi ........................ 455/277
4,527,136 7/1985 Kamiya ........................ 455/3
4,538,175 8/1985 Balbes et al. ........................ 455/12
4,542,300 9/1985 Nagatomi ........................ 333/103

*Primary Examiner*—Jin F. Ng
*Attorney, Agent, or Firm*—Rogers, Howell, Moore & Haferkamp

[57] ABSTRACT

An improved polarity switch for connection between a dual antenna system and a satellite television reception system has a first embodiment which utilizes a pin diode switch between the dual antenna system and each of a plurality of receivers to permit use of the receiver to select one of the two antenna feeds for decoding and display at that television set. A second embodiment is also disclosed which utilizes an electromechanical relay to isolate the antenna feeds from each receiver.

20 Claims, 4 Drawing Figures

POLARITY SWITCH FOR SATELLITE TELEVISION RECEIVER

BACKGROUND AND SUMMARY

The assignee of the present patent application and invention is also the owner of a Horton et al patent application for a Polarity Switch for Satellite Television Receiver having a Ser. No. 695,458 and a filing date of Jan. 18, 1985. In that application, an invention is disclosed which interconnects between the horizontal polarity antenna feed and vertical polarity antenna feed of a dual feed antenna system and a television receiver as is typically used in a satellite television receiver system for receiving, decoding and displaying television signals broadcast from satellites. In the polarity switch disclosed in that application, the pulse width modulated receiver signal generated by the receiver to select between the two antenna feeds is decoded and used to switch a pin diode switch so that the selected antenna feed is transmitted to the receiver. Using the polarity switch of that invention, a plurality of receivers throughout the home and each individual receiver can select and display any channel of either the vertical polarity station group or the horizontal polarity station group. The polarity switch of that invention is a good and valuable invention and has provided a unique solution to adapt the dual feed antenna system to existing receivers.

The inventors herein have succeeded in designing an improved polarity switch which also utilizes a pin diode switch circuit in switching the RF signal path between the receiver and each of the vertical polarity and horizontal polarity antenna inputs. However, this improved polarity switch provides additional advantages and features which are not found in the polarity switch previously disclosed and claimed. For example, a single comparator and its bias circuitry is used to detect the incoming receiver signal and produce a logical 0 or 1 output instead of the two stage detection and comparator design in the prior invention. In the pin diode switch portion of this new circuit, two diodes are used in each switching leg between the antenna input and the receiver input to increase isolation and reliability. Additionally, the unused RF antenna signal is shunted to ground through another switched diode in each leg to further enhance the separation and minimize potential for interference between the antenna inputs. Still another feature is an improved DC power path between the receiver input and each of the antenna inputs to provide DC power to both antenna electronic components, with each DC power path having a steering diode to increase isolation and prevent stray DC signals from interfering with receiver operation. Still another added feature of the present design of the improved polarity switch is that the four switching diodes between the antenna inputs and the receiver input are forward biased with a quiescent voltage to increase circuit reliability and provide back biasing voltages to aid in turning off diodes as they are switched from one mode to another.

In an alternate embodiment, the same comparator circuit is used to detect the receiver signal input, but a pair of relays are substituted for the pin diode switch and its associated driver ciruitry which provides some advantages for some installations over the pin diode switch embodiment. Additionally, it increases the separation between antenna feeds as an electromechanical relay is utilized which, despite component failure, can only connect one antenna signal to the receiver. The relay embodiment is much simpler, with much fewer circuit elements, and in some installations minimizes the number of coax cables which must be laid between the antenna and the home.

A few of the functional features and advantages of this improved polarity switch have been mentioned above. A more complete understanding of these features can be gained by reviewing the drawings and description of the preferred embodiment which follows.

DETAILED DESCRIPTION OF THE PREFERRED EMBODIMENT

Figure 1:
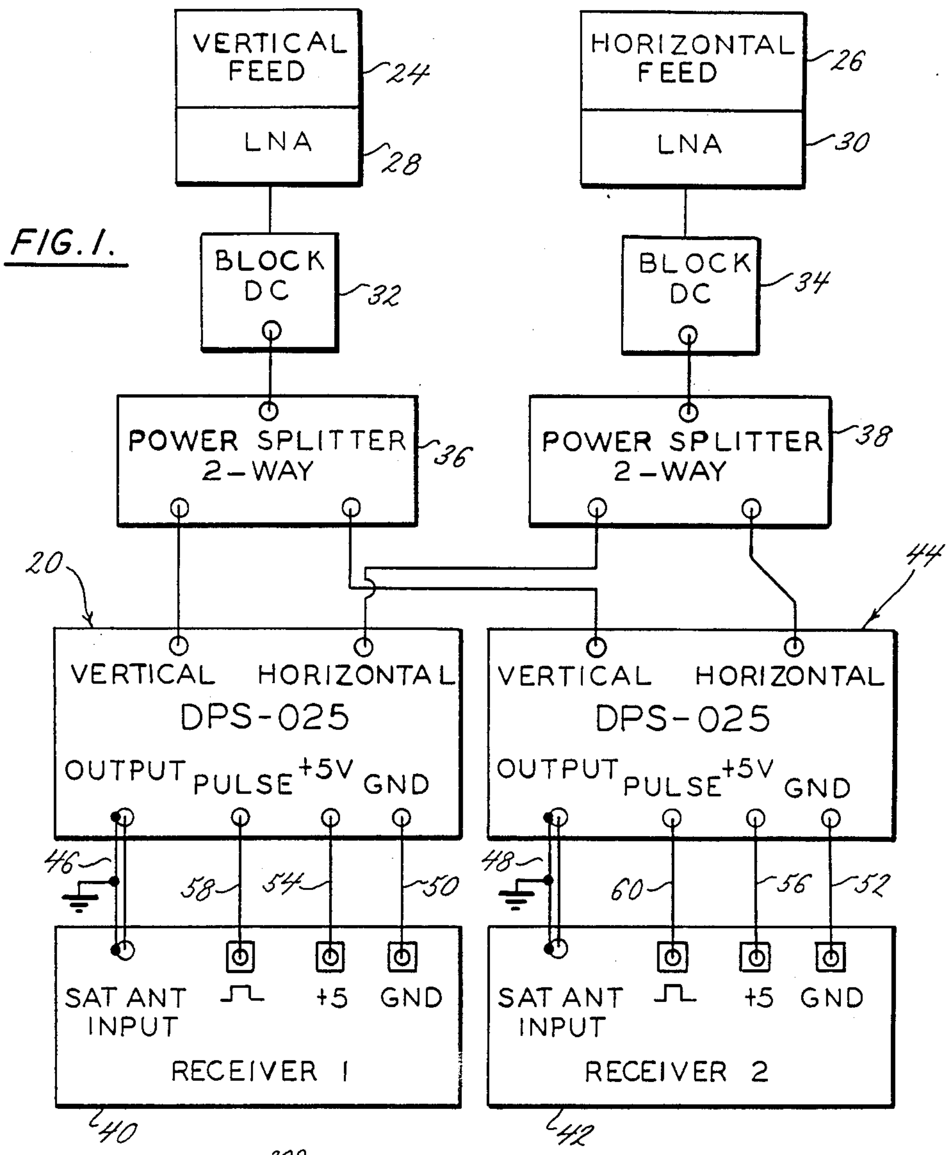
FIG. 1 is a block diagram of a satellite television receiver system including separate antenna feeds for vertical and horizontal polarity signals, and the improved polarity switch of the pin diode embodiment shown connected to each of two receivers.

The first embodiment 20 as shown connected in a satellite television receiving system is shown in block diagram form in FIG. 1 and includes an antenna system having a vertical feed 24 and a horizontal feed 26, as known in the art, to receive the different polarities of signals from transponders in a satellite. Each feed 24, 26 has its own low noise amplifier 28, 30 and block down converter 32, 34 also as known in the art. Each of these produce a signal having a full range of television stations being received of either a vertical or horizontal polarity. Each of these signals is then fed to a power splitter 36, 38, the output of each being input to a polarity switch 20 of the first embodiment. Thus, a first signal having all channels of vertical polarity and a second signal having all channels of horizontal polarity are input to the first embodiment 20 as shown in FIG. 1. A first television receiver 40 is connected to one of the polarity switches 20, and a second receiver 42 is shown connected to another polarity switch 44 of the first embodiment. Connections between each of the polarity switches 20, 44, and the receivers 40, 42 include a coaxial cable 46, 48 for transmitting the selected antenna input signal; a ground wire 50, 52; a plus 5 volts DC power supply line 54, 56; and a selector line 58, 60 which is used to transmit a selection signal generated by the receiver, the selection signal having one of two pulse width modulations, the pulse width of one signal being greater than the pulse width of the other signal. Thus, in response to a pulse width signal being transmitted over conductor 58, 60, the polarity switch 20, 44 will transmit either the vertical feed antenna signal, or the horizontal feed antenna signal. Similarly, for the selector signal having the other pulse width signal, the polarity switch 20, 44 will transmit the other group of channels being received by either the vertical feed antenna 24 or the horizontal feed antenna 26. This switching in response to the signal transmitted by receiver 40, 42 through conductor 58, 60 is shown in greater detail in FIG. 2.

Figure 2:
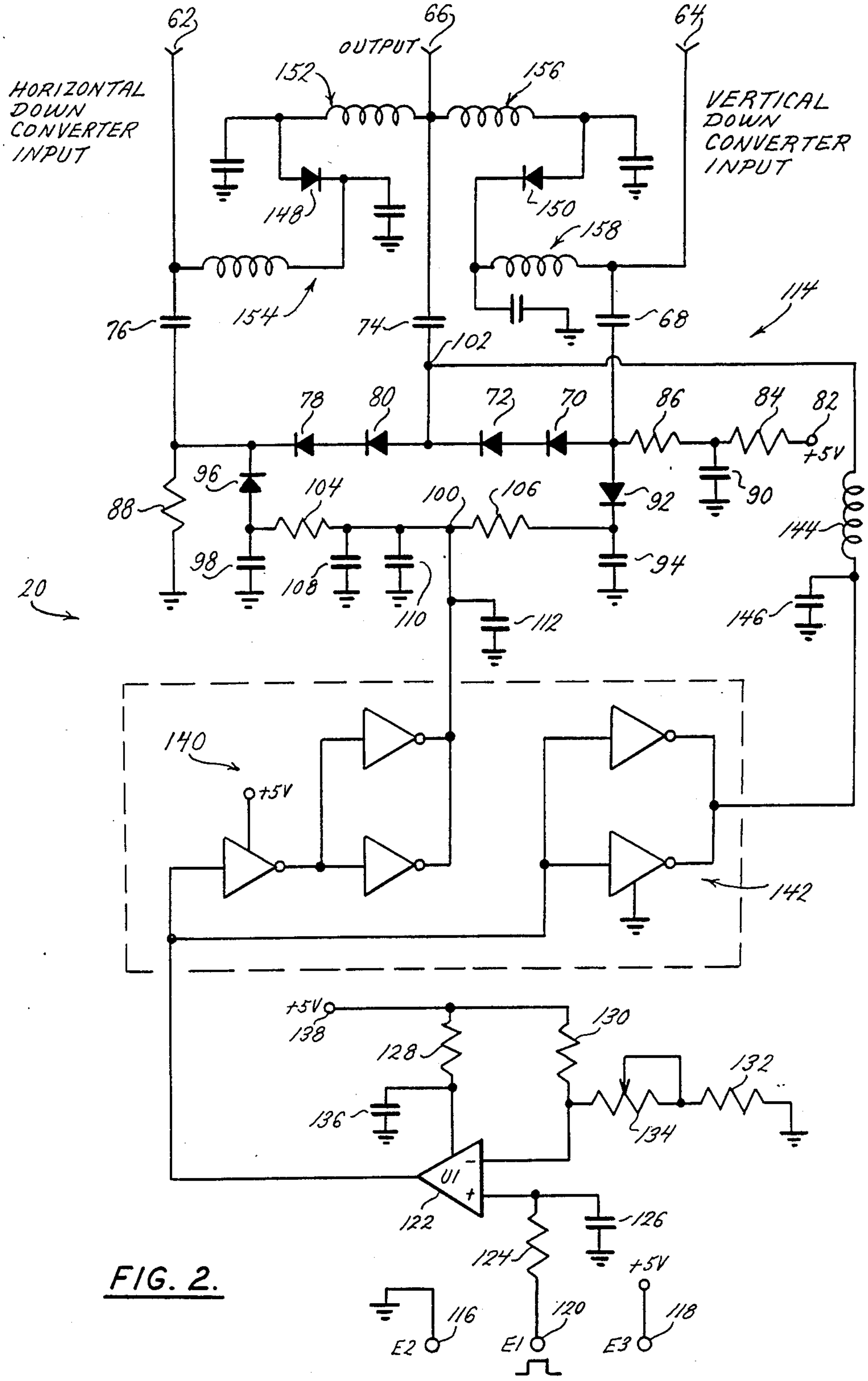
FIG. 2 is a detailed schematic diagram of the pin diode switch embodiment of the improved polarity switch of the present invention.

Referring now to FIG. 2, the first embodiment 20 has a horizontal feed antenna input 62, a vertical antenna feed input 64 and an output 66 which is connected to conductor 46 to transmit the selected signal to the receiver 40. The RF signal path from the vertical antenna input 64 to the receiver output 66 is principally through a DC blocking capacitor 68, switching diodes 70, 72, and another DC blocking capacitor 74. Similarly, the RF signal path from the horizontal antenna input 62 to the receiver output 66 goes through a DC blocking capacitor 76, swiching diodes 78, 80, and the same DC blocking capacitor 74 as mentioned above. Switching diodes 70, 72, 78, 80 are initially biased in a conductive state through the small forward voltage applied by the five volt DC voltage point 82, connected across resistors 84, 86 and resistor 88, and filter capacitor 90. Diode 92 and capacitor 94 provide an alternate path to ground for the vertical antenna input, and diode 96 and capacitor 98 provide an alternate path to ground for horizontal input 62, depending upon the selected signal. The switching of diodes 70, 72 and diodes 78, 80 are controlled by the voltages impressed at circuit nodes 100, 102 respectively. Bias resistors 104, 106 and RF filter capacitors 108, 110, 112 complete the RF portions of the circuitry, the above comprising the pin diode switch portion 114 which effectively switches the RF signal from the horizontal input 62 nd the vertical input 64 so that only one is connected to the output 66. This switching action is described below in the Operation section.

At the bottom of FIG. 2 are the connections to the receiver. They include a ground connection 116, a plus 5 volts power connection 118, and a receiver signal terminal 120 which receives the pulse width modulated signal from the receiver to select which of the two inputs 62, 64 is desired to be connected to the receiver through output 66. The pulse width modulated receiver signal is input to a comparator 122, which may be a type 358, and through an RC circuit comprising resistor 124 and capacitor 126. This RC circuit smooths the receiver signal such that the approximate average or DC value of the signal is input to the non-inverting terminal of the comparator 122. A voltage divider circuit comprising resistors 128, 130, 132, adjustable resistor 134, and capacitor 136 are connected between the plus 5 volts power supply 138 and the inverting input of comparator 122 and adjusted to a value such that it is in between the two average values of receiver signal being input to the comparator 122 as determined by the receiver signal and the RC circuit comprising resistor 124 and capacitor 126. Thus, the output of 122 is either a logical 0 or a logical 1 depending upon the particular receiver signal input at terminal 120. The output of comparator 122 is parallel fed to two sets of inverters 140 and 142, which may be type 4049 inverters. The inverter set 140 is comprised two stages of amplification such that its output to circuit node 100 is at the same logical value, i.e. either 0 volts or plus 5 volts, as is input to the inverter set 140. However, the inverter set 142 is comprised of only one set of inverters such that its output is inverted from the differential amplifier 122 output. Inverter set 142 has its output applied to circuit node 102 through a decoupling filter comprised of inductor 144 and capacitor 146 which shunts to ground any stray RF signals and prevents interference between the pin diode switch portion 114 and the other portions of the circuit as just described.

Still another function required of the polarity switch 20 of the present invention is that it pass DC power from the receiver output 66 to each of the horizontal antenna input 62 and the vertical antenna input 64 to supply power up the line to the power splitters 36, 38 and block DC converters 32, 34, all as known in the art. This is achieved without interfering with RF switching by means of a pair of steering diodes 148, 150, such as type IN4001 diodes; each of which is surrounded by a pair of low pass filters 152, 154, 156, 158. Thus, DC signals are free to conduct through each of the steering diodes 148, 150 and their surrounding low pass filters from output 66 to each of the horizontal input 62 and the vertical input 64. However, RF signals are blocked and shunted to ground through the low pass filters 152, 154, 156, 158.

Figure 3:
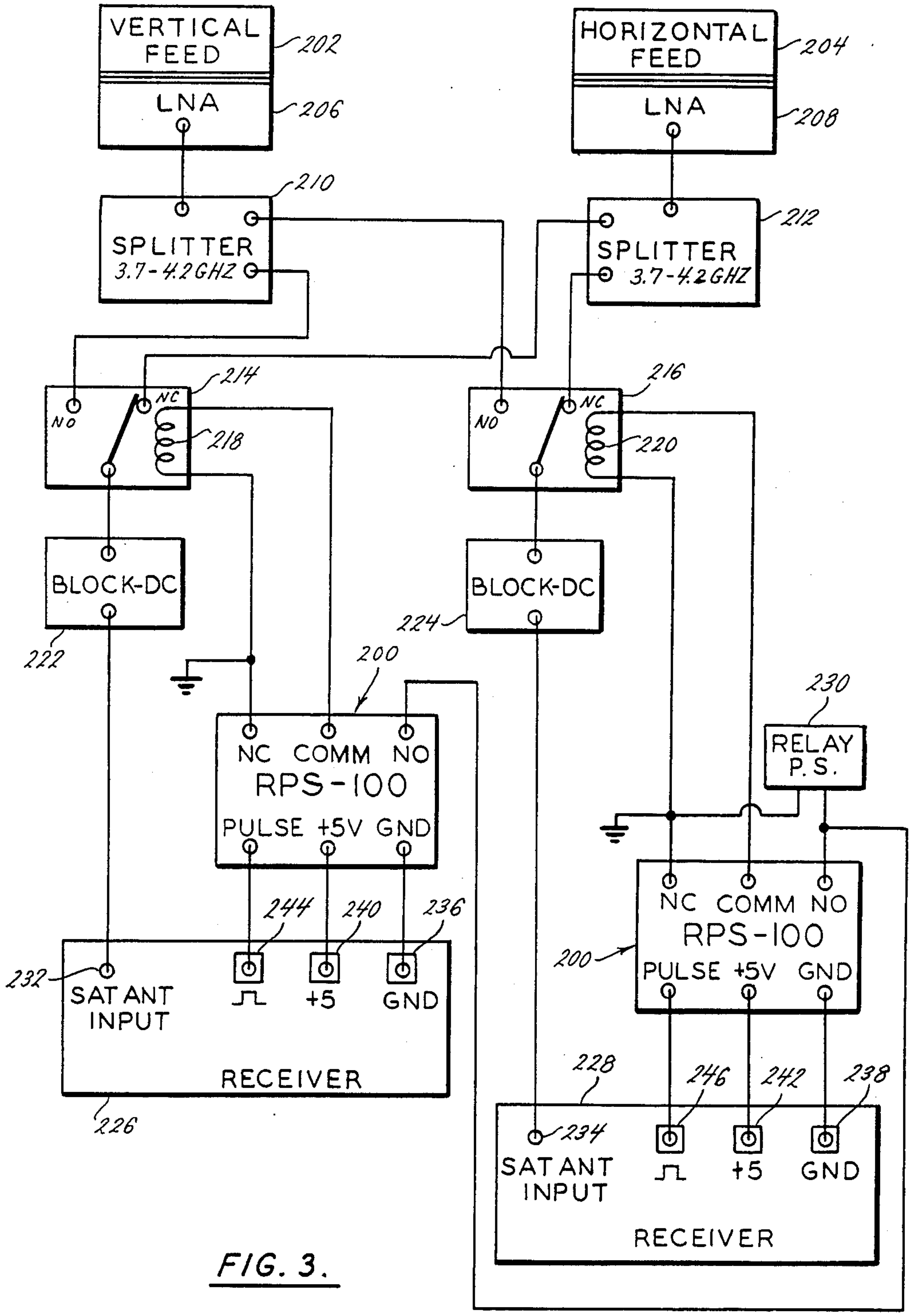
FIG. 3 is a block diagram of a satellite television reception system showing vertical polarity and horizontal polarity antenna feeds and the relay embodiment of the improved polarity switch of the present invention connected to each of two receivers.

An alternate embodiment of the polarity switch 200 is shown in FIG. 3 and is shown as it would be connected for operation in a satellite television receive only system. As in the first embodiment, an antenna system receives both the vertical polarity channels through a vertical feed 202 and the horizontal polarity channels through a horizontal feed 204, both of which have their associated low noise amplifiers 206, 208 respectively. These signals are then input to a pair of signal splitters 210, 212 which provides an output to each of two single pole, double throw relays 214, 216, as shown. Each of the single pole, double throw relays 214, 216 has an operating coil 218, 220 which is operated by its associated polarity switch 200. As is shown in FIG. 3, only one of the vertical polarity signal or horizontal polarity signal is fed to a block DC converter 222, 224 and its output is provided to the receiver 226, 228. A relay power supply 230 provides the power required to operate the relay coils 218, 220, and is input to each of the polarity switches 200 as shown connected in FIG. 3. As in applicant's first embodiment, each receiver 226, 228 has an input terminal 232, 234 for the selected antenna signal from either the vertical feed 202 or horizontal feed 204; a ground terminal 236, 238; a plus 5 volts power terminal 240, 242 to provide power to the polarity switch 200, and a receiver signal terminal 244, 246 which provides the pulse width modulated signal to the polarity switch 200 to select either the vertical feed 202 or horizontal feed 204 for receiver reception.

Figure 4:
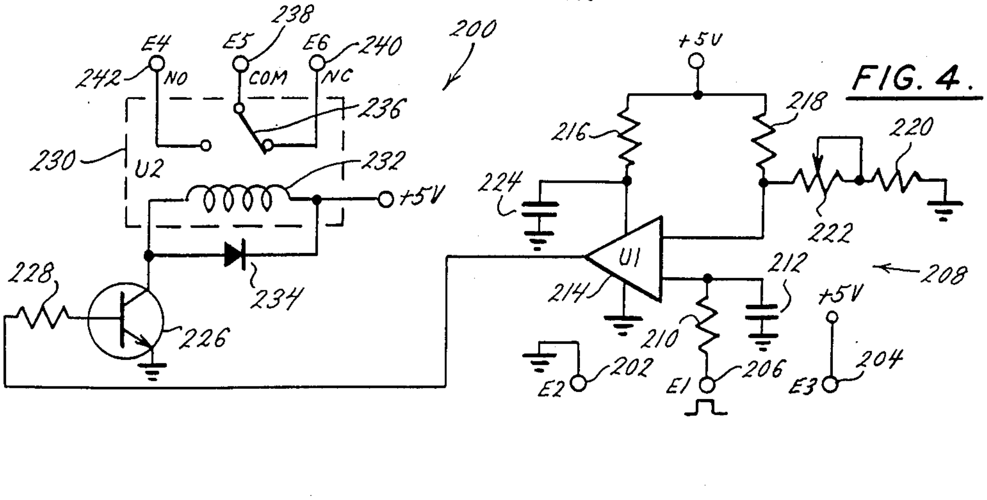
FIG. 4 is a detailed schematic diagram of the relay embodiment of the improved polarity switch of the present invention.

The circuitry of the polarity switch 200 is shown in FIG. 4 and includes a ground terminal 202, a plus 5 volts terminal 204 for receiving power from the receiver, and a receiver signal 206 for receiving the pulse width modulated signal from the receiver. The input portion 208 of this embodiment 200 is substantially the same as the input portion of applicant's first embodiment 20 as shown in FIG. 2. It includes an RC circuit comprising resistor 210 and capacitor 212 connected to the non-inverting input of comparator 214, and a reference voltage adjust circuit comprising resistors 216, 218, 220, adjustable resistor 222 and capacitor 224 connected to the other input of comparator 214 to produce a logical 0 at 0 volts or a logical 1 at plus 5 volts at its output. The output of differential amplifier 214 is used to drive a transistor 226 through resistor 228 and operate relay 230. As shown, relay 230 includes a relay coil 232 with a transient suppression diode 234 in parallel thereto which, when actuated, operates the single pole, double throw contact 236. As shown, the single pole, double throw contact 236 completes the circuit between terminals 238 and 240 when the relay coil 232 is not energized, or it completes the circuit between terminal 242 and terminal 238 when the relay coil 232 is energized. As shown in FIG. 3, when the relay 230 is not energized, power from the relay power supply 230 flows through terminal 240 and terminal 238 to energize coil 220 of relay 216 and toggle it from the normally closed to normally open position to switch the vertical feed signal from vertical feed 202 to the receiver 228. When relay coil 232 is actuated by transistor 226, the single pole, double throw contact 236 toggles to complete the circuit between terminals 238 and 242 which shunts to ground the relay coil 220 of relay 216 and thereby toggle the relay to the normally closed position, as shown in FIG. 3. In that position, the horizontal feed signal from horizontal feed 204 is delivered through the block DC converter 224 to receiver 228.

It is noted that in both embodiments, either receiver can select to receive either the vertical feed polarity signal or the horizontal feed polarity signal independently of the other receivers which may be connected. Therefore, an individual home owner may have one antenna with a single vertical feed and a single horizontal feed, and a plurality of polarity switches mated to a plurality of receivers such that one watching television in the living room may receive the horizontal polarity channels while one watching in the family room or kitchen may receive the vertical polarity channels without interference between receivers. Furthermore, the standard receiver control signal may be utilized to select which polarity signals shall be received at that particular receiver. It shall also be appreciated that the physical placement of the polarity switches of the present invention, and the block DC converters and relays in the various embodiments of this invention may be selected to minimize long runs of coaxial cable, and to further optimize the usage of existing runs of cable depending upon the particular installation. For example, referring to FIG. 1, only the polarity switches and receivers need be inside the home, but that would require four coaxial cables extending from the antenna installation to the home. Alternatively, the power splitters may also be resident inside the home which reduces the number of coaxial cables required to run from the antenna installation to the home to two.

Similarly, referring to FIG. 3, applicant's polarity switch and receiver need only be resident in the home, and in this embodiment only one coaxial cable need be run from the antenna installation to the home as the relays and block DC converters may be positioned at the antenna. The two wires extending between the relays and the polarity switch may be just single conductor insulated cable which is relatively inexpensive and which may already be in place for other purposes. Thus, the alternative embodiment of applicant's polarity switch as shown in FIG. 3 provides the same functional advantages of applicant's first embodiment, with the additional advantage that only a single coaxial cable need be installed between the antenna system and the home, a condition which may be more likely in existing installations. Use of this embodiment would avoid the addition of another coaxial cable from the antenna system to the home.

Operation

As mentioned above, the switching action of the pin diode switch portion 114 is controlled by the relative voltages at circuit nodes 100 and 102. The output of comparator 122 is either a logical 0 or logical 1 which corresponds to a 0 volts or plus 5 volts, and is directly related to the pulse width modulated signal being received from the receiver which indicates whether the horizontal or vertical set of antenna inputs is desired by the TV viewer. This logical 0 or plus 1 signal is then parallel fed to two sets of inverters, one of which merely amplifies, while the other both amplifies and inverts the logical signal from the comparator. Therefore, if the voltage impressed at circuit node 100 is at 0, then the voltage impressed at circuit node 102 is at logical 1, and vice versa. Assuming that the plus 1 logical signal is applied at node 102, it can be seen that diodes 78, 80 are forward biased and turned on through resistor 88, thereby completing the RF path between horizontal input 62 and output 66, it being remembered that forward biased diodes conduct RF signals in either direction. At the same time, as a plus 5 volts is applied at circuit node 102, and only a somewhat reduced voltage is applied from voltage point 82 across resistors 84, 86 to forward bias diodes 70, 72; diodes 70, 72 are thus reverse biased and turned off. Therefore, they block RF signals from vertical input 64 to output 66. At the same time, diode 92 is forward biased and passes the RF signal from vertical input 64 to ground through capacitor 94. On the other side, diode 96 remains reverse biased because of the voltage across resistor 88 which ensures that the RF voltage does not shunt to ground from horizontal input 62.

Assuming the other condition, i.e. where plus 5 volts is applied to circuit node 100 and 0 volts is applied to circuit node 102, diodes 70, 72 are switched on due to the voltage supplied from voltage point 82 across resistors 84, 86. The plus 5 volts at circuit node 100 charges capacitor 94 through resistor 106, and the voltage which builds up on capcitor 94 reverse biases diode 92 and turns it off, thereby eliminating the RF shunt to ground. The plus 5 volts at circuit node 100 forward biases diode 96 through resistors 104, 88 and turns it on to provide a shunt for the RF signal from horizontal input 62 to ground through capacitor 98. Also, the voltage across resistor 88 creates a back voltage greater than the 0 volts at circuit node 102 to reverse bias diodes 78, 80 and turn them off and keep them off during this selected mode.

Thus, it is seen that the pin diode switch portion 114 serves to effectively switch the RF signal from either the horizontal input or the vertical input to the output, and also shunts to ground the non-selected RF signal to avoid any possibility of interference between the signals. As explained above, a steady DC power current is supplied through steering diodes 148, 150 to circuit elements upstream of the polarity switch 20 of the present invention and do not interfere with the RF signals being switched by the pin diode switch portion 114. The decoupler filter comprising inductor 144 and capacitor 146 further decouples the two portions of this circuit to prevent RF signal interference with the DC portion which develops the logical 1 and logical 0 voltage levels for proper circuit operation.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

We claim:

1. In a television system for receiving and processing a plurality of television signals, said system including an antenna means for receiving said television signals, said antenna means having a plurality of outputs, each of said outputs being associated with one of said television signals, and a receiver means for processing one of said television signals, said receiver means having means to generate a coded signal indicative of one of said antenna means outputs for processing by the receiver means, the improvement comprising a switching means for connection between the antenna means and the receiver means, said switching means including means to decode said receiver means signal, and a pin diode switch having means to shunt to ground all television signals except the television signal corresponding to the receiver means coded signal in response to the decoded receiver means coded signal.

2. The device of claim 1 wherein the switching means further comprises a DC power circuit between each antenna means output and the receiver means.

3. The device of claim 2 wherein each DC power circuit includes a steering diode to block DC power from flowing back into the receiver means.

4. The device of claim 3 wherein each DC power circuit includes a pair of low pass filters, one connected to each side of the steering diode.

5. The device of claim 1 wherein the decoding means further comprises a comparator means to decode the receiver signal and produce a logic signal.

6. The device of claim 5 further comprising an amplifier means to amplify the logic signal and an inverter means to amplify and invert the logic signal, said amplifier means output and said inverter means output being connected to the pin diode switch to operate same.

7. The device of claim 6 wherein the pin diode switch includes at least one diode between each of the antenna outputs and the receiver means, and means to forward bias said diodes absent a receiver signal input.

8. The device of claim 7 wherein the pin diode switch includes two diodes between each of the antenna outputs and the receiver means.

9. The device of claim 6 further comprising a decoupling filter in circuit between the pin diode switch and one of the amplifier means or inverter means.

10. In a television system for receiving and processing a plurality of television signals, said system including an antenna means for receiving said television signals, said antenna means having a plurality of outputs, each of said outputs being associated with one of said television signals, and a receiver means for processing one of said television signals, said receiver means having means to generate a signal indicative of one of said antenna means outputs for processing by the receiver means, the improvement comprising a switching means for connection between the antenna means and the receiver means, the switching means including a decoding means to process the receiver signal and generate a logic signal in response thereto, an amplifier means to amplify the logic signal, an inverter means to amplify and invert the logic signal, said amplifier means and inverter means being connected in parallel to the output of the decoding means, and a pin diode switch connected between the antenna means outputs and the receiver means input, said pin diode switch having at least one diode connected between each antenna means output and the receiver means input, means to shunt to ground all television signals except the television signal corresponding to the receiver signal, and at least one DC power circuit between the receiver means input and one of the antenna means outputs, the output of the amplifier means and the inverter means being connected to the pin diode switch so that the pin diode switch switches in response thereto.

11. The device of claim 10 wherein the pin diode switch further comprises at leat two diodes between each antenna means output and the receiver means input, and a DC power circuit between each antenna means output and the receiver means input, each DC power circuit including a steering diode to block DC power from flowing into the receiver means.

12. A polarity switch adapted for connection between at least two satellite television antenna outputs and a satellite television receiver, each of said antenna outputs being associated with a television signal, the receiver having means to generate a coded signal indicative of one of said antenna outputs and its associated television signal for processing by the receiver, the polarity switch comprising means to decode the receiver signal, means to electrically connect one of said antenna outputs to the receiver for transmission of its associated television signal to the receiver for processing, and means to electrically shunt to ground all other antenna outputs in response to the receiver coded signal.

13. The switch of claim 12 wherein the electrical connection means and shunt means comprises a pin diode switch.

14. The switch of claim 13 wherein the pin diode switch includes a DC power circuit between each antenna output and the receiver.

15. The switch of claim 14 wherein the decoding means further comprises a comparator to decode the receiver signal and produce a logic signal in response thereto.

16. The switch of claim 15 wherein the decoding means further comprises an amplifier means to amplify the logic signal and an inverter means to amplify and invert the logic signal, said amplifier output and said inverter output being connected to the pin diode switch to operate same.

17. The switch of claim 16 wherein the pin diode switch includes at least two diodes between each of the antenna outputs and the receiver.

18. The switch of claim 17 wherein each DC power circuit includes a steering diode to block DC power from flowing back into the receiver, and a pair of low pass filters, one of said filters being connected to each side of its associated steering diode.

19. The switch of claim 18 wherein the pin diode switch further comprises means to forward bias the diodes connected between the antenna outputs and the receiver absent a receiver signal input.

20. The switch of claim 19 further comprising a decoupling filter in circuit between the pin diode switch and one of the amplifier means or inverter means.

* * * * *